US006994654B2

(12) United States Patent
Sakaguchi et al.

(10) Patent No.: US 6,994,654 B2
(45) Date of Patent: Feb. 7, 2006

(54) SYSTEM AND METHOD FOR CONTROLLING ENGINE IDLE SPEED OF INTERNAL COMBUSTION ENGINE

(75) Inventors: Shigeyuki Sakaguchi, Yokohama (JP); Hirofumi Yano, Yokohama (JP); Tomohiko Takahashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/623,175

(22) Filed: Jul. 21, 2003

(65) Prior Publication Data

US 2004/0106499 A1 Jun. 3, 2004

(30) Foreign Application Priority Data

Sep. 25, 2002 (JP) ............................ 2002-279473

(51) Int. Cl.
*B60K 41/02* (2006.01)
*B60K 41/04* (2006.01)

(52) U.S. Cl. ...................................... 477/181; 477/110

(58) Field of Classification Search ............ 477/110–2, 477/181
See application file for complete search history.

(56) References Cited

U.S. PATENT DOCUMENTS 4,951,627 A * 8/1990 Watanabe et al. ........... 477/111
5,199,399 A * 4/1993 Shibuya ...................... 477/111
5,855,533 A * 1/1999 Tolkacz et al. ............. 477/110
5,863,277 A * 1/1999 Melbourne .................. 477/203
6,352,491 B2 * 3/2002 Mashiki et al. ............. 477/181
6,634,984 B1 * 10/2003 Doering et al. ............. 477/181
6,799,108 B2 * 9/2004 Aldrich et al. .............. 477/181
2002/0019291 A1 * 2/2002 Ito ............................ 477/111

FOREIGN PATENT DOCUMENTS

JP 2000-45834 A 2/2000

* cited by examiner

*Primary Examiner*—Roger Pang
(74) *Attorney, Agent, or Firm*—Foley & Lardner LLP

(57) ABSTRACT

System and method for controlling idle speed for a vehicle including an internal combustion engine coupled to an automatic transmission which has a torque converter. The system includes a sensor operative to detect a parameter based on a torque converter speed ratio and generate a signal indicative of the parameter detected, and a controller programmed to determine basic idle speed, determine a target idle speed by correcting the basic idle speed based on the signal when the automatic transmission is in a drive range in engine idling condition. The method includes determining basic idle speed when the automatic transmission is in a drive range in engine idling condition, detecting a parameter based on a torque converter speed ratio, and determining a target idle speed by correcting the basic idle speed based on the parameter.

28 Claims, 9 Drawing Sheets

SYSTEM AND METHOD FOR CONTROLLING ENGINE IDLE SPEED OF INTERNAL COMBUSTION ENGINE

BACKGROUND OF THE INVENTION

The present invention relates to a system and method to control engine idle speed of an internal combustion engine coupled to an automatic transmission with a torque converter, and more specifically to controlling the engine idle speed in a drive range of the automatic transmission.

Engine idle speed control systems for an internal combustion engine of a vehicle are adapted to control an amount of air flow which is introduced to the engine (hereinafter referred to as an idle air flow amount), so as to match engine speed with target idle speed during an idle operation of the engine.

Japanese Patent Application First Publication No. 2000-45834 discloses an engine idle speed control system in which when an automatic transmission is operated in a drive (D) range during engine idle operation at a stop state of the vehicle, a basic idle air flow amount is corrected to increase based on a D-range idle-up correction value and idle speed feedback control is conducted to control the idle air flow amount such that engine speed is matched with a target idle speed. When the vehicle starts at D range state of the automatic transmission, the feedback control is stopped and the increased basic idle air flow amount is corrected by subtracting a vehicle speed correction value which is determined based on vehicle speed therefrom. This related art aims to prevent excessive increase in the idle air flow amount during the vehicle traveling.

Further, there has been proposed an engine idle speed control system in which when the vehicle speed exceeds a set value, for example, 4–6 km/h, the feedback control is prohibited and the idle air flow amount is controlled to a constant value, while when the vehicle speed is not more than the set value, the feedback control is permitted. Recently, there is a demand for facilitating transition to the feedback control by enhancing the set value of the feedback permission vehicle speed (feedback prohibition vehicle speed), thereby enhancing convergence of idle speed to a target idle speed and improving fuel economy.

SUMMARY OF THE INVENTION

However, the above-described related arts have the following problems. Specifically, the idle air flow amount required in D range in engine idling condition is determined as an air flow amount corresponding to an engine output torque balanced with an absorption torque of a torque converter which is generated when the vehicle is at a stop state. At the vehicle stop state, a torque converter speed ratio determined by dividing torque converter output turbine speed by engine speed is zero. When a brake is released, the vehicle speed gradually rises up and the torque converter speed ratio increases. The absorption torque of the torque converter decreases so that the engine speed largely rises up as compared with that at the vehicle stop state. In this condition, if the feedback control of the idle speed is executed, the idle air flow amount will decrease to be not more than the idle air flow amount required at the vehicle stop state. Subsequently, if the brake is engaged and the torque converter speed ratio becomes zero, the idle air flow amount corresponding to the torque converter absorption torque will lack to cause drop of the idle speed. In the worst case, this will lead to engine stall. In order to avoid the problem, the feedback permission vehicle speed must be determined at a relatively low value. This causes delay in starting the feedback control and in converging the idle speed to the target idle speed.

Further, if the system of the above-described Japanese Patent Application First Publication No. 2000-45834 is applied to such an engine having a slow air response speed, wherein the idle air flow amount is corrected to decrease based on the vehicle speed, there will occur delay in controlling supply of an air flow amount required at the vehicle stop state, namely, delay in controlling recovery of the decrease in the idle air flow amount, when the brake is suddenly engaged upon the vehicle traveling in engine idling condition. In other words, there will occur delay in controlling recovery of the decrease in the idle air flow amount. This will result in engine stall.

It is an object of the present invention to eliminate the above-described disadvantages and provide a system and method for controlling an engine idle speed of an internal combustion engine, which is capable of improving drivability during D range idling operation, thereby preventing occurrence of an engine stall and enhancing the feedback permission vehicle speed.

In one aspect of the present invention, there is provided an idle speed control system for a vehicle including an internal combustion engine coupled to an automatic transmission which has a torque converter, the idle speed control system comprising:

a sensor operative to detect a parameter based on a torque converter speed ratio and generate a signal indicative of the parameter detected; and a controller programmed to:

determine basic idle speed; and determine a target idle speed by correcting the basic idle speed based on the signal when the automatic transmission is in a drive range in engine idling condition.

In another aspect of the invention, there is provided a method for controlling an engine idle speed in an internal combustion engine of a vehicle, the internal combustion engine being coupled to an automatic transmission having a torque converter, the method comprising:

determining basic idle speed when the automatic transmission is in a drive range in engine idling condition;

detecting a parameter based on a torque converter speed ratio; and determining a target idle speed by correcting the basic idle speed based on the parameter.

DETAILED DESCRIPTION OF THE INVENTION

Figure 1:
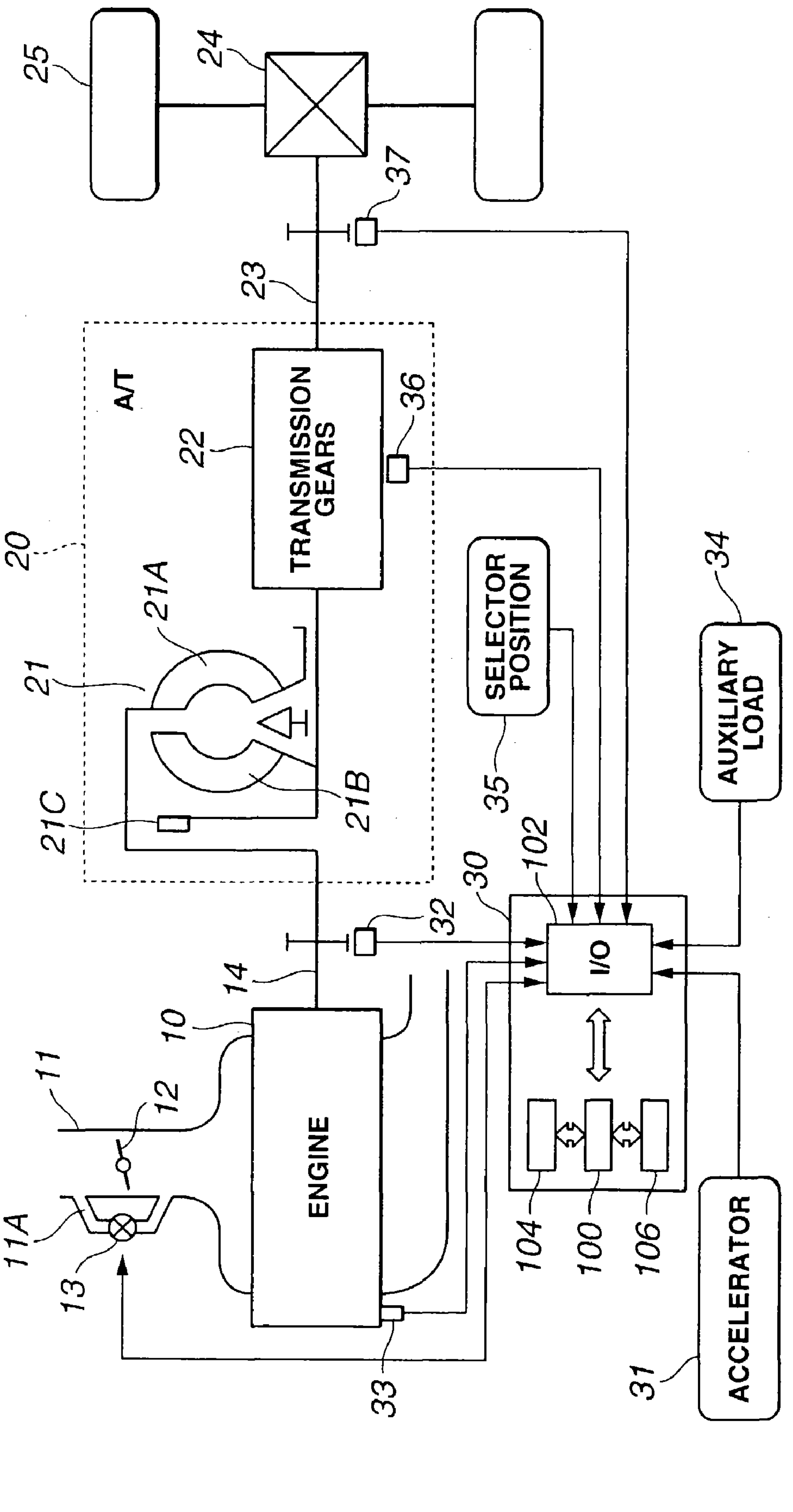
FIG. 1 is a block diagram of a system of a first embodiment of the present invention.

Referring to FIG. 1, there is shown a vehicle drive system of a first embodiment of the present invention. As illustrated in FIG. 1, internal combustion engine 10 includes intake air passage 11 and throttle valve 12 disposed within intake air passage 11. Idle control valve 13 is disposed within air bypass passage 11A so as to control an amount of intake air flow bypassing throttle valve 12 during idling operation of engine 10. Idle control valve 13 is electronically connected to engine controller (ECU) 30. The opening degree of idle control valve 13 is controlled by ECU 30.

Output shaft (crankshaft) 14 of engine 10 is coupled to automatic transmission (A/T) 20. A/T 20 includes torque converter (T/C) 21 coupled with output shaft 14, and transmission gears 22 coupled with T/C 21. T/C 21 includes pump impeller 21A on the input side, turbine runner 21B on the output side, and lockup clutch 21C adapted for directly coupling pump impeller 21A and turbine runner 21B. Transmission gears 22 change rotational speed output from turbine runner 21B and transmit the changed rotational speed to wheels 25 via output shaft 23 and differential gear 24.

A plurality of sensors are connected to ECU 30. The sensors includes accelerator opening degree sensor 31, engine speed sensor 32 and water temperature sensor 33. Accelerator opening degree sensor 31 detects an opening degree of an accelerator, namely, a depression amount of an accelerator, and generates signal APO indicative of the detected opening degree. Crank angle sensor 32 acting as an engine speed sensor detects rotation of output shaft 14 of engine 10 and generates signal REF, POS indicative of the detected rotation. Water temperature sensor 33 detects an engine cooling water temperature and generates signal Tw indicative of the detected water temperature. Auxiliary load switch 34 is connected to ECU 30. Auxiliary load switch 34 detects an auxiliary load, namely, ON/OFF state, of auxiliary equipments such as an air conditioner, a power steering and the like, and generates ON/OFF signal indicative of the detected auxiliary load. The sensors further includes selector position sensor 35, gear position sensor 36 and transmission output shaft rotation sensor (vehicle speed sensor) 37. Selector position sensor 35 detects an automatic transmission operating range including neutral (N), drive (D), park (P) and the like, which is selected by a vehicle operator with a shift selector, and generates a signal indicative of the detected range N, D, P and the like. Gear position sensor 36 detects a gear ratio of transmission gears 22 and generates signal Gr indicative of the detected gear ratio. Vehicle speed sensor (transmission output shaft rotation sensor) 37 detects rotational speed of output shaft 23 of transmission gears 22 and generates signal VSP indicative of the detected rotational speed as vehicle speed. Specifically, these signals are transmitted to an A/T controller, not shown, and then transmitted to ECU 30 via line. For the purpose of simple illustration, the A/T controller is omitted in FIG. 1. ECU 30 produces idle switch signal based on signal APO generated by accelerator opening degree sensor 31. ECU 30 calculates engine speed Ne based on crank angle signal REF, POS generated by crank angle sensor 32. ECU 30 further calculates torque converter turbine speed Nt of T/C 21 based on a product of vehicle speed (transmission output shaft rotational speed) VSP and gear ratio Gr. In this embodiment, ECU 30 is a microcomputer including central processing unit (CPU) 100, input and output ports (I/O) 102, read-only memory (ROM) 104, random access memory (RAM) 106 and a common data bus.

Based on the signals as described above, ECU 30 processes the signals to determine engine operating conditions, calculate various parameters and execute controls of idle speed and idle air flow amount using the parameters, as explained later. ECU 30 further controls a fuel supply amount to be supplied to engine 10 so as to provide a desired air-fuel ratio between a fuel amount and an intake air flow amount.

Figure 2:
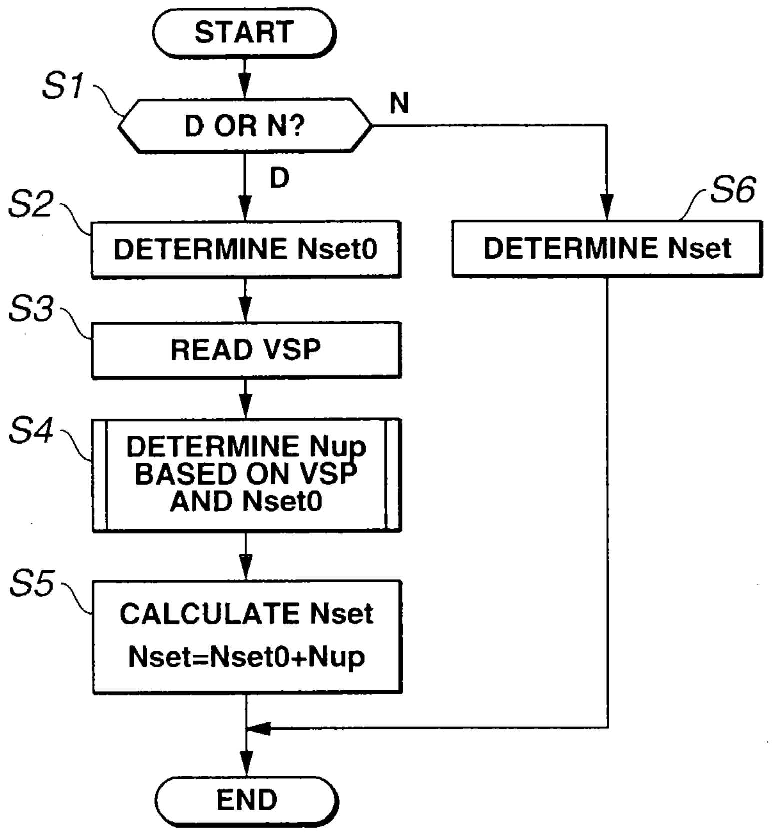
FIG. 2 is a flow chart of a routine of determining target idle speed.

Referring now to FIGS. 2–6, the controls of idle speed and idle air flow amount which are executed by ECU 30 is explained. FIG. 2 illustrates a routine of determining a target idle speed. Logic flow starts and goes to block S1 where a determination as to whether A/T 20 is operated in D range or N range is made based on signal D or N from selector position sensor 35. When the answer to block S1 is N range, the logic flow jumps to block S6. At block S6, target idle speed Nset in N range is determined based on engine cooling water temperature signal Tw and auxiliary load ON/OFF signal. The logic flow goes to end. When the answer to block S1 is D range, the logic flow proceeds to block S2 where basic idle speed Nset0 in D range at the vehicle stop state is determined. For instance, if an air conditioner is turned OFF after warming engine 10, basic idle speed Nset0 is determined at 550 rpm. If the air conditioner is turned ON after warming engine 10, basic idle speed Nset0 is determined at 800 rpm. The logic flow then proceeds to block S3 where vehicle speed VSP detected by vehicle speed sensor 37 is read, and then to block S4.

Figure 3:
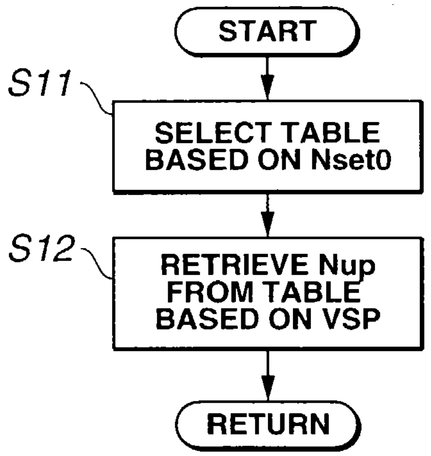
FIG. 3 is a flow chart of a subroutine of determining add speed.

At block S4, add speed Nup as correction value for basic idle speed Nset0 is determined based on vehicle speed VSP and basic idle speed Nset0 in accordance with a subroutine shown in FIG. 3. The subroutine is executed by ECU 30. As illustrated in FIG. 3, logic flow starts and goes to block S11. At block S11, on the basis of basic idle speed Nset0, a table is selected from a plurality of tables which are stored in ECU 30 corresponding to different values, such as 550 rpm, 800 rpm, . . . etc., of basic idle speed Nset0.

Figure 4:
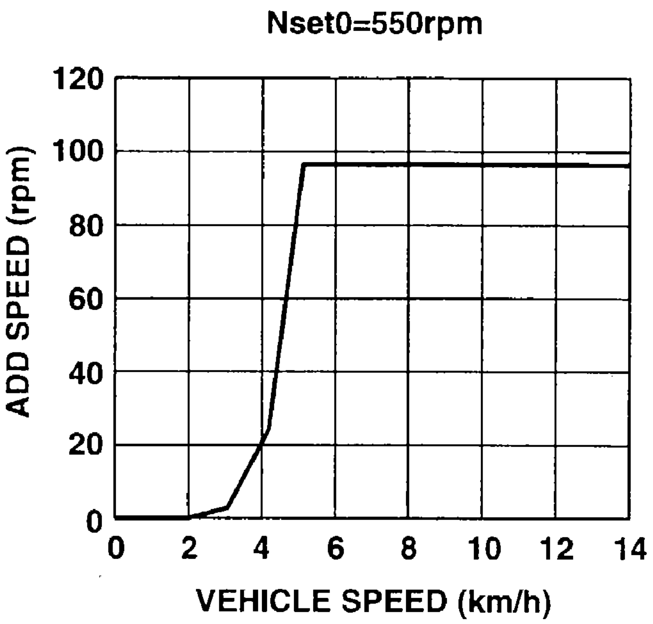
FIG. 4 is a table showing a relationship between vehicle speed and add speed in the case of Nset0=550 rpm.
Figure 5:
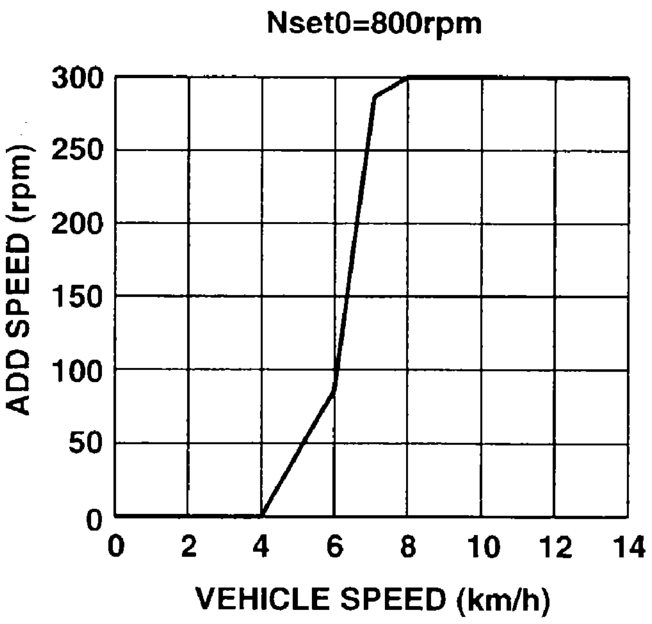
FIG. 5 is a table showing a relationship between vehicle speed and add speed in the case of Nset0=800 rpm.

Specifically, for example, FIGS. 4 and 5 show tables which indicate add speed Nup relative to vehicle speed VSP in the case of basic idle speed Nset0=550 rpm and add speed Nup relative thereto in the case of basic idle speed Nset0=800 rpm, respectively. Here, as understood from FIGS. 4 and 5, as vehicle speed VSP increases, add speed Nup is determined at a larger value so as to increase target idle speed Nset. Further, as basic idle speed Nset0 increases, add speed Nup is determined at a larger value so as to increase target idle speed Nset.

The subroutine goes to block S12 in FIG. 3, where the selected table is looked up and add speed Nup is retrieved from the selected table on the basis of current vehicle speed VSP. The subroutine then goes to return.

Referring back to the routine in FIG. 2, at block S5, target idle speed Nset is calculated by adding add speed Nup to basic idle speed Nset0. Basic target idle speed Nset0 is corrected to increase with add speed Nup. Thus, target idle speed Nset is obtained. The routine then goes to end.

Figure 6:
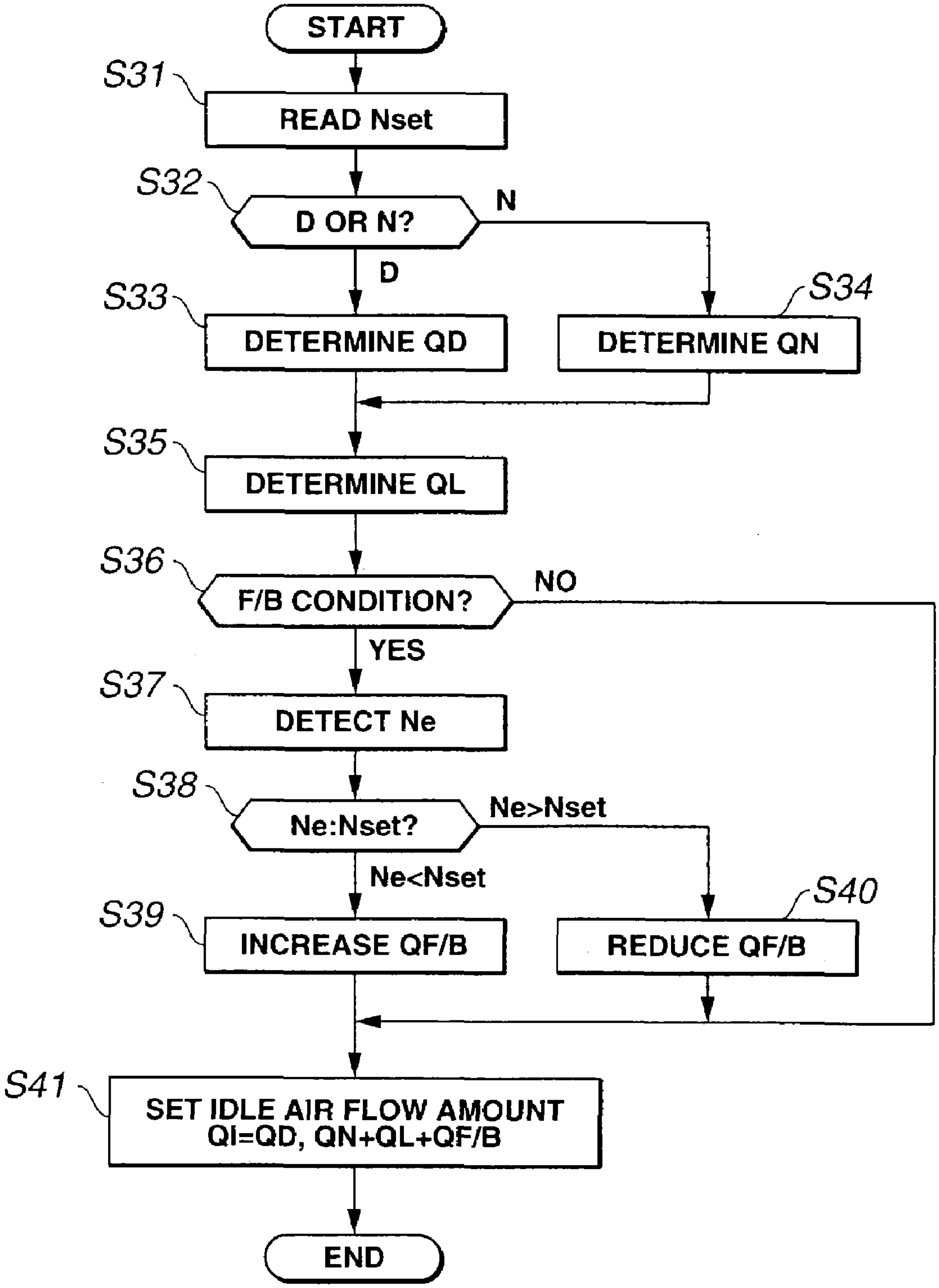
FIG. 6 is a flow chart of a routine of controlling idle air flow amount.

FIG. 6 illustrates a routine of controlling an idle air flow amount. Logic flow starts and goes to block S31 where target idle speed Nset determined by the routine of FIG. 2 is read. The logic flow proceeds to block S32 where a determination as to whether A/T 20 is in D range or N range is made based on signal D or N from selector position sensor 35. When the answer to block S32 is D range, the logic flow proceeds to block S33 where basic air flow amount QD required in D range operation, hereinafter referred to as D-range basic air flow amount QD, is determined based on target idle speed Nset read at block S31. When the answer to block S32 is N range, the logic flow proceeds to block S34 where basic air flow amount QN required in N range operation, hereinafter referred to as N-range basic air flow amount QN, is determined based on target idle speed Nset read at block S31. The determination of D-range basic air flow amount QD and N-range basic air flow amount QN is performed using a table shown in FIG. 7.

Figure 7:
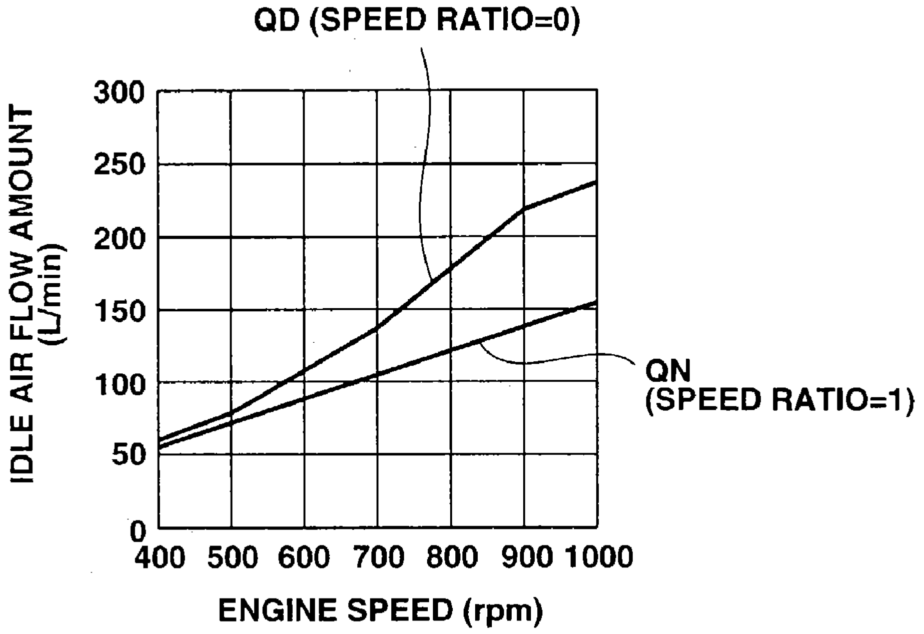
FIG. 7 is a table showing a relationship between engine speed and air flow amount.

FIG. 7 shows a relationship between engine speed Ne and idle air flow amount QI required for maintaining engine speed Ne when A/T 20 is in D range (T/C speed ratio= 0) and N range operation (T/C speed ratio=1). In FIG. 7, two curves indicate D-range basic air flow amount QD and N-range basic air flow amount QN relative to engine speed Ne, respectively. Here, D-range basic air flow amount QD is an idle air flow amount required at the vehicle stop state in D range wherein T/C speed ratio is zero. D-range basic air flow amount QD is obtained by adding absorption torque of T/C 21 to N-range basic air flow amount QN.

Referring back to FIG. 6, the logic flow goes to block S35. At block S35, the state of auxiliary load of auxiliary equipment, for example, an air conditioner and a power steering, is determined based on ON/OFF signal of auxiliary load switch 34. Based on the auxiliary load state determined, load drive air flow amount QL required for driving the auxiliary equipment is determined. The logic flow proceeds to block S36 where a determination is made as to whether feedback control condition (F/B condition) for implementing idle speed feedback control is fulfilled. Specifically, it is determined that engine 10 is in idling condition at accelerator opening degree APO of zero and vehicle speed VSP is not more than feedback permission vehicle speed (F/B permission vehicle speed), 14 km/h in this embodiment. When the answer to block S36 is yes, the logic flow proceeds to block S37 where engine speed Ne is detected. The logic flow then goes to block S38 where engine speed Ne is compared with target idle speed Nset. When the answer to block S38 is Ne<Nset, the logic flow proceeds to block S39 where feedback air flow amount QF/B is increased. The logic flow goes to block S41. At block S41, idle air flow amount QI is set by summing basic air flow amount QD, QN, load drive air flow amount QL, and feedback air flow amount QF/B. In contrast, when the answer to block S38 is Ne>Nset, the logic flow proceeds to block S40 where feedback air flow amount QF/B is reduced. The logic flow proceeds to block S41.

When the answer to block S36 is no, feedback air flow amount QF/B is held at a current value, and the logic flow jumps to block S41.

Figure 8:
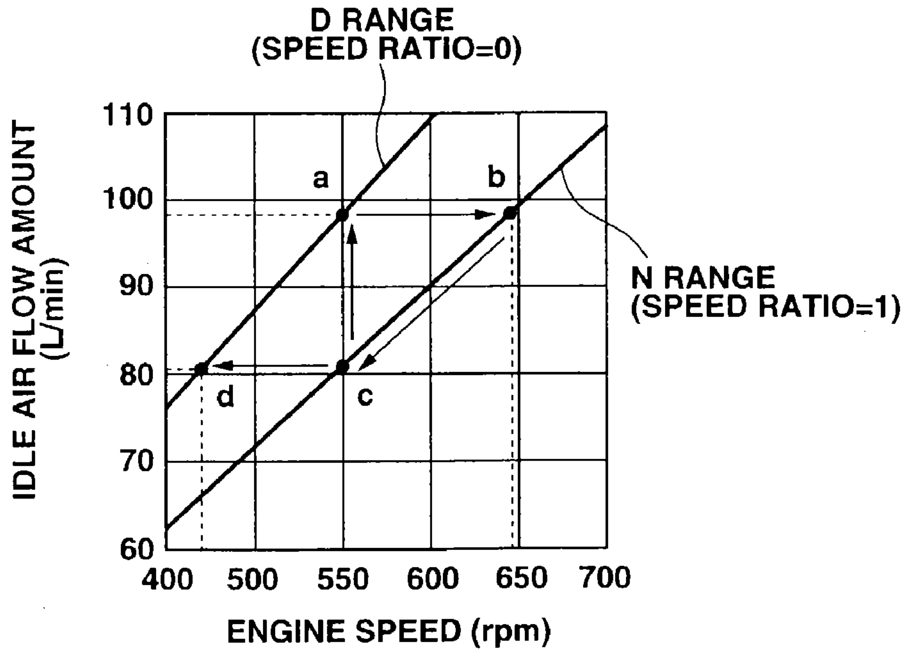
FIG. 8 is an enlarged part of the table shown in FIG. 7.
Figure 9:
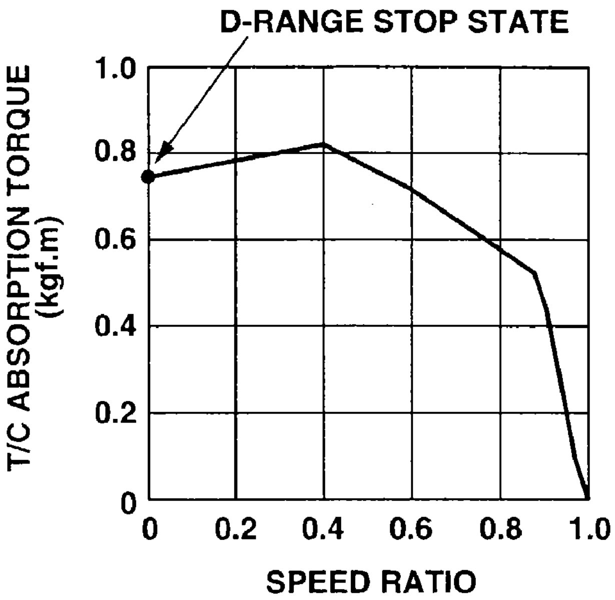
FIG. 9 is a table showing a relationship between torque converter speed ratio and torque converter absorption torque.
Figure 10:
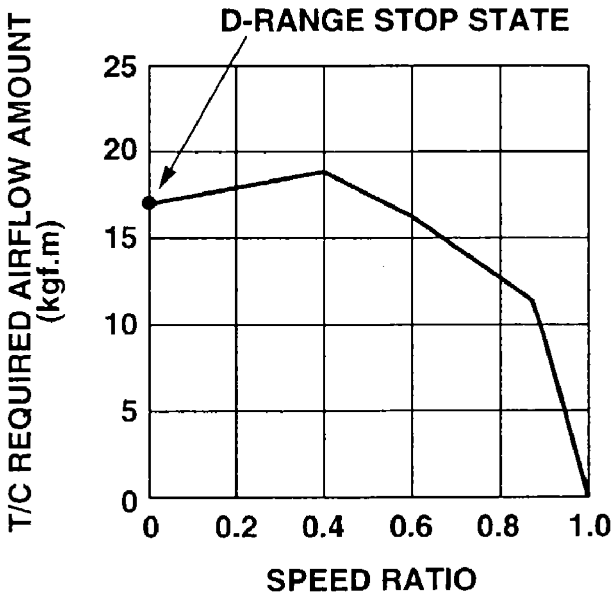
FIG. 10 is a table showing a relationship between torque converter speed ratio and torque converter required air flow amount.

Referring to FIGS. 8–11, an operation of the control of the system of the present invention will be explained as compared with that of the related arts as described above. FIG. 8 illustrates an enlarged important part of FIG. 7. First, the control of the system of the related arts is described. As illustrated in FIG. 8, when engine speed Ne is 550 rpm and N range is selected in which the rotation transmission is interrupted within transmission gears 22 of A/T 20 and the speed ratio of T/C 21 is 1, the idle air flow amount is 81 L/min as indicated at point c. When D range is then selected with the brake applied, torque converter required air flow amount of 17 L/min corresponding to torque converter absorption torque is added to 81 L/min so that the idle air flow amount increases to 98 L/min as indicated at point a. FIG. 9 shows a relationship between torque converter speed ratio and torque converter absorption torque. FIG. 10 shows a relationship between torque converter speed ratio and torque converter required air flow amount. The torque converter required air flow amount of 17 L/min in D range (speed ratio=0) is indicated in FIG. 10. In D range condition, the torque converter speed ratio is zero and the engine speed is maintained at 550 rpm without conducting the feedback control.

When the brake is then released, the vehicle starts traveling by the creeping force of T/C 21 and the torque converter speed ratio gradually varies from zero toward 1.0. As shown in FIG. 10, when the torque converter speed ratio is 1.0, the torque converter required air flow amount becomes zero. Accordingly, when the torque converter speed ratio reaches 1.0, there occurs a surplus of the torque converter required air flow amount of 17 L/min. As illustrated in FIG. 8, with the surplus of the air flow amount of 17 L/min, the idle speed increases by 96 rpm, i.e., from 550 rpm to 646 rpm during traveling in engine idling condition, as indicated at point b. At this state, engine 10 is in high idling condition.

In the high idling condition, the idle speed feedback control starts to gradually reduce the surplus of the air flow amount of 17 L/min until the idle air flow amount becomes 81 L/min as indicated at point c. In this condition, when the brake is applied to stop the vehicle, a lack of the air flow amount of 17 L/min is caused due to the reduction of the air flow amount of 17 L/min by the feedback control. As a result, the total idle air flow amount becomes 81 L/min, though the total idle air flow amount of 98 L/min is required in D range at the vehicle stop state as explained above. Namely, in this condition, since the air flow amount supplied is too small, the engine speed is reduced to the point d shown in FIG. 8, thereby causing engine stall. In order to avoid this problem, in the related arts, the idle speed feedback control is prohibited under such high idling condition that the speed ratio is about 1.0.

In contrast, in the idle speed control of the present invention, the surplus of the idle air flow amount of 17 L/min is eliminated by increasing target idle speed Nset, for instance, increased from 550 rpm to 646 rpm, during traveling. Therefore, even if the idle speed feedback control is performed, the idle air flow amount can be prevented from decreasing. Target idle speed Nset can be determined depending on the torque converter speed ratio. In a simple manner, as vehicle speed VSP increases, target idle speed Nset can be determined at a higher value.

Figure 11:
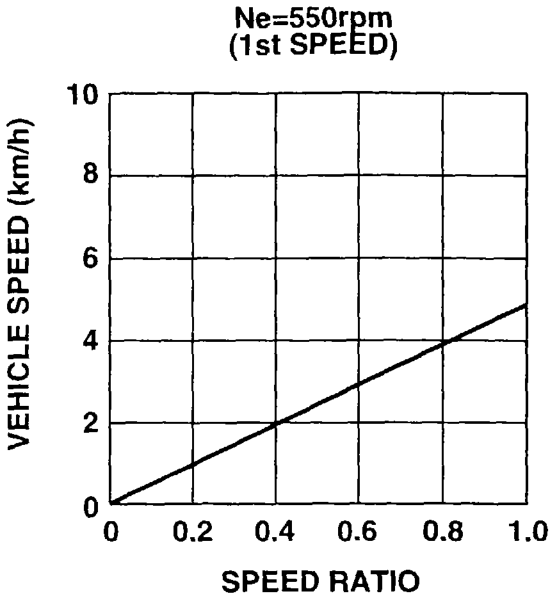
FIG. 11 is a table showing a relationship between torque converter speed ratio and vehicle speed in the case of engine speed of 550 rpm.

Specifically, FIG. 11 shows a relationship between torque converter speed ratio and vehicle speed VSP in the case of engine speed Ne of 550 rpm. In FIG. 11, as vehicle speed VSP increases, the torque converter speed ratio becomes closer to 1.0. As the torque converter speed ratio approaches 1.0, the surplus of the idle air flow amount increases. Further, as the surplus of the idle air flow amount becomes larger, the idle air flow amount to be reduced by the feedback control increases. Therefore, the surplus of the idle air flow amount can be reduced by controlling target idle speed Nset depending on vehicle speed VSP, namely, by increasing target idle speed Nset as vehicle speed VSP becomes higher. As a result, the idle air flow amount to be decreased by the feedback control can be reduced so that engine stall can be prevented. Specifically, in the case of basic idle speed Nset0 of 550 rpm, when vehicle speed VSP is 4 km/h, target idle speed Nset is set at 575 rpm (550 rpm+25 rpm). In the same case, when vehicle speed VSP is 5 km/h, target idle speed Nset is set at 646 rpm (550 rpm+96 rpm).

Figure 12:
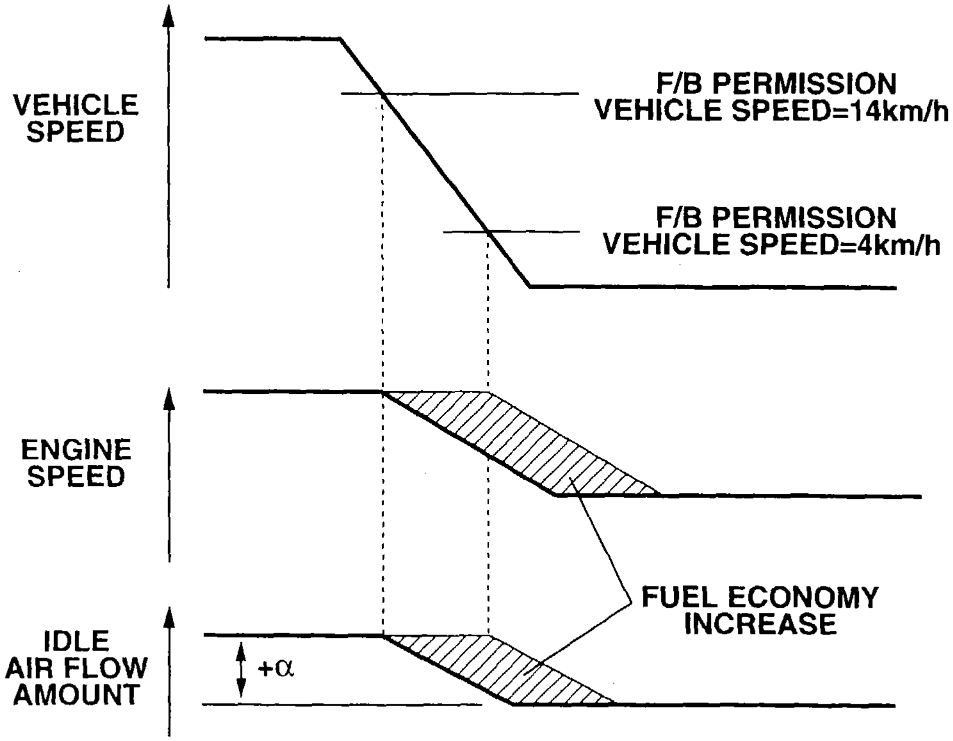
FIG. 12 is a diagram showing an improvement in convergence of idle speed according to the present invention.

As explained above, the idle speed control of the present invention can prevent reduction of the idle air flow amount even if the idle speed feedback control is performed at the torque converter speed ratio of not less than 1. FIG. 12 shows an improvement in fuel economy in a case where the F/B permission vehicle speed is set at a large value, namely, 14 km/h in this embodiment, under condition that the vehicle operation shifts from the deceleration state to the stop state. When vehicle speed VSP decreases to 14 km/h or less, the feedback control can perform to adjust the idle speed to the target idle speed. This enhances convergence of the idle speed to the target idle speed. Meanwhile, in this embodiment, the F/B permission vehicle speed is set at not more than 14 km/h in order to conduct the feedback control at $1^{st}$ speed selector position. The selector position is usually shifted down from $2^{nd}$ speed to $1^{st}$ speed at 16 km/h of vehicle speed VSP. Therefore, if the F/B permission vehicle speed is set at 14 km/h, there is an allowance of 2 km/h from the F/B permission vehicle speed. Further, as shown in FIG. 12, the idle air flow amount provided in non-feedback control condition is given by the idle air flow amount+$\alpha$. Notwithstanding the target idle speed is determined relatively higher, the air flow amount provided after performing the feedback control gradually decreases finally to the small air flow amount equal to that required in engine idling condition at the vehicle stop state. The air flow amount is determined under condition that the torque converter speed ratio is zero, and controlled by increasing the target idle speed if vehicle speed VSP is high and the torque converter speed ratio is large. As a result, the convergence of the idle speed to the target idle speed can be enhanced.

As understood from the above explanation, the first embodiment of the present invention can prevent occurrence of engine stall and adjust F/B permission speed to a higher value, thereby serving for enhancing convergence of the idle speed to the target idle speed and improving fuel economy.

Further, in the first embodiment, ECU 30 can perform optimal correction of basic idle speed Nset0 by determining the correction value (add speed Nup) such that target idle speed Nset is increased as the torque converter speed ratio varies from 0 toward 1. Further, ECU 30 can easily perform the correction of basic idle speed Nset0 by using vehicle speed VSP as a parameter relative to the torque converter speed ratio. Further, ECU 30 can perform optimal correction of basic idle speed Nset0 by determining the correction value (add speed Nup) so as to increase target idle speed Nset as the parameter (vehicle speed VSP) increases.

Further, ECU 30 determines the correction value (add speed Nup) at different values on the basis of basic idle speed Nset as shown in FIGS. 4 and 5. Therefore, ECU 30 can determine an optimal correction value (add speed Nup) even if basic idle speed Nset0 in engine idling condition at the vehicle stop state is altered, thereby serving for reducing errors upon executing the feedback control. Furthermore, since ECU 30 stores a plurality of tables for the correction values (add speed Nup) corresponding to different values of basic idle speed Nset0 as shown in FIGS. 4 and 5, calculation of the correction value (add speed Nup) can be simplified.

Figure 13:
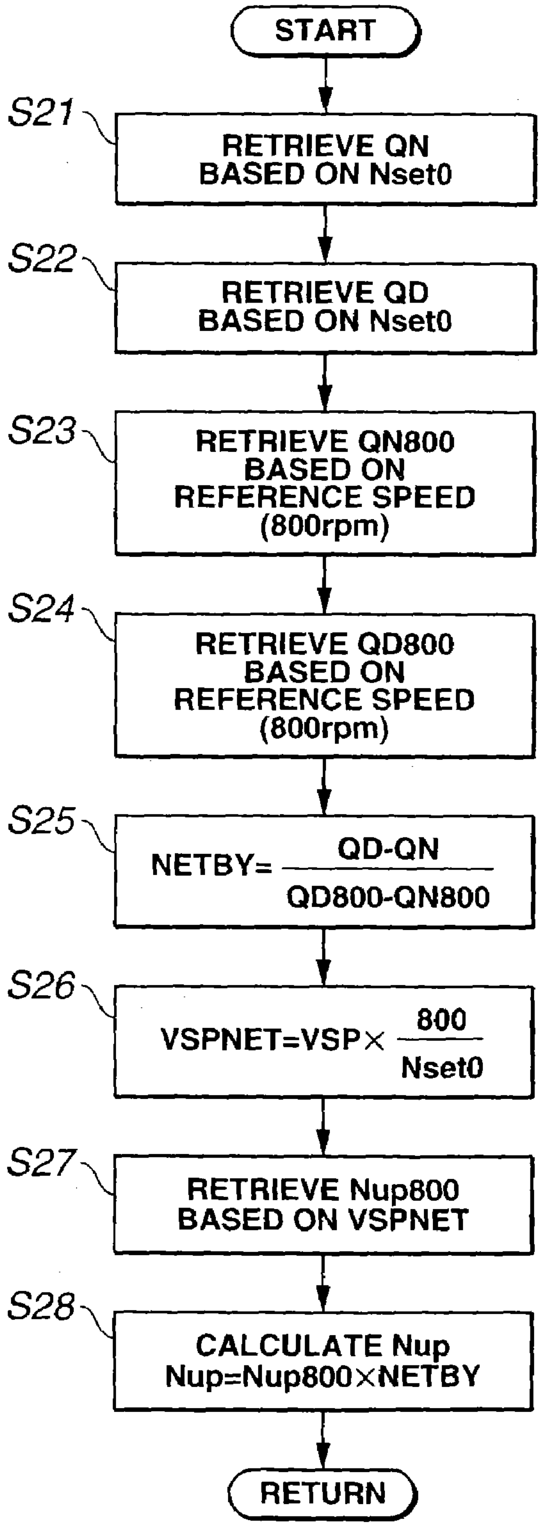
FIG. 13 is a flow chart of a subroutine of determining add speed in a second embodiment of the present invention.
Figure 14:
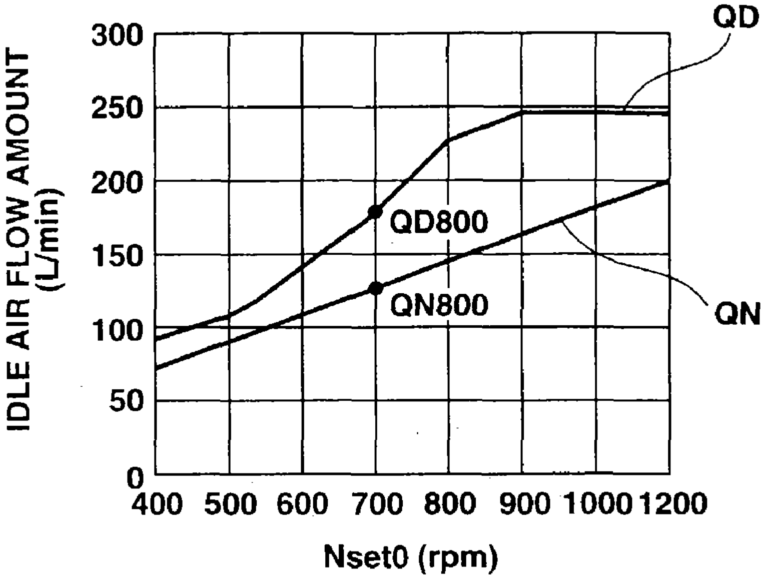
FIG. 14 is a table showing a relationship between target idle speed and idle air flow amount.
Figure 15:
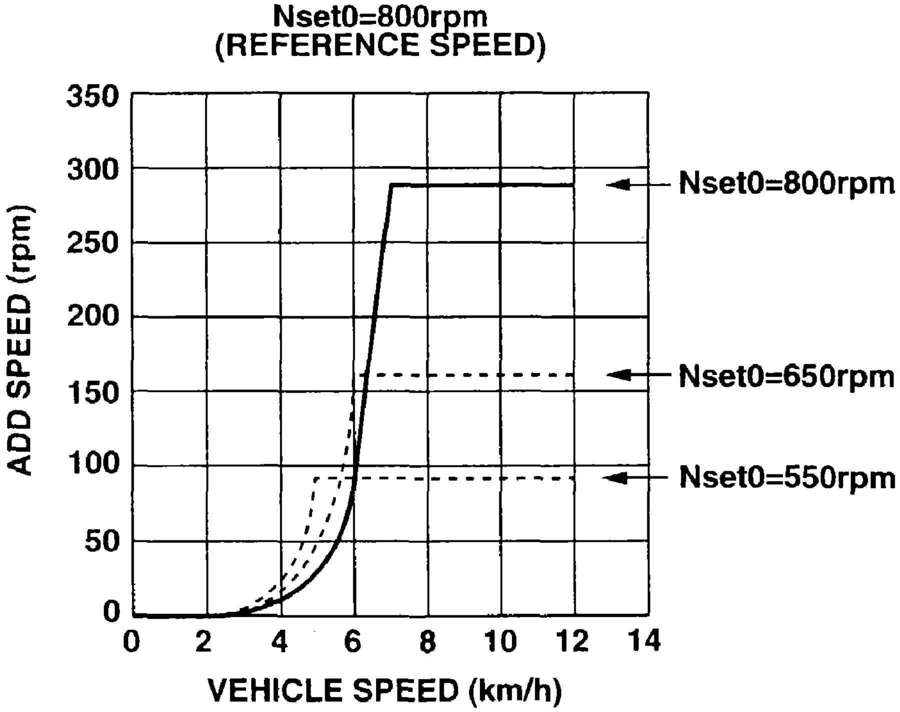
FIG. 15 is a table showing a relationship between vehicle speed and add speed in the case of basic idle speed (reference speed) of 800 rpm.

Referring to FIGS. 13–15, a second embodiment of the present invention will be explained hereinafter. The second embodiment differs in that the subroutine of determining add speed Nup as shown in FIG. 13 is executed instead of the subroutine shown in FIG. 3, from the first embodiment. In this embodiment, tables as shown in FIGS. 14 and 15 are used. FIG. 14 shows the table indicating basic air flow amount QD for D range operation (D-range basic air flow amount QD) and basic air flow amount QN for N range operation (N-range basic air flow amount QN) relative to basic idle speed Nset0. FIG. 15 shows the table which indicates add speed Nup relative to vehicle speed VSP in a case where basic idle speed Nset0 is a predetermined reference speed, namely, 800 rpm in this embodiment. These tables are stored in ECU 30.

As illustrated in FIG. 13, logic flow starts and goes to block S21. At block S21, N-range basic air flow amount QN is retrieved from the table as shown in FIG. 14 on the basis of basic idle speed Nset0. The logic flow proceeds to block S22 where D-range basic air flow amount QD is retrieved from the table as shown in FIG. 14 on the basis of basic idle speed Nset0. The logic flow proceeds to block S23 where N-range basic air flow amount QN800 in the case of the reference speed of 800 rpm is retrieved from the table as shown in FIG. 14. The logic flow proceeds to block S24 where D-range basic air flow amount QD800 in the case of the reference speed of 800 rpm is retrieved from the table as shown in FIG. 14.

The logic flow then proceeds to block S25. At block S25, correction coefficient NETBY at reference add speed Nup800 explained later is calculated. Correction coefficient NETBY is a ratio of a difference between D-range air flow amount QD at basic idle speed Nset0 and N-range air flow amount QN at basic idle speed Nset0 to a difference between D-range basic air flow amount QD800 at the reference speed of 800 rpm and N-range basic air flow amount QN800 at the reference speed of 800 rpm. Correction coefficient NETBY is calculated by the following formula.

$$NETBY=(QD-QN)/(QD\mathbf{800}-QN\mathbf{800})$$

The logic flow proceeds to block S26 where reference vehicle speed VSPNET, which is vehicle speed VSP in the case of the reference speed of 800 rpm, is calculated by correcting vehicle speed VSP. Reference vehicle speed VSPNET is obtained as a product of vehicle speed VSP and a ratio of the reference speed of 800 rpm to basic idle speed Nset0. Reference vehicle speed VSPNET is represented by the following formula.

$$VSPNET=VSP\times(800/Nset\mathbf{0})$$

The logic flow then proceeds to block S27. At block S27, reference add speed Nup800, which is add speed Nup relative to reference vehicle speed VSPNET, is retrieved from the table shown in FIG. 15. The logic flow proceeds to block S28 where add speed Nup is calculated from reference add speed Nup800 and correction coefficient NETBY. Namely, reference add speed Nup800 is corrected to be multiplied by correction coefficient NETBY. Add speed Nup is thus obtained. The logic flow goes to return.

Similar to the first embodiment, the second embodiment can prevent occurrence of engine stall and determine F/B permission speed at a higher value. This serves for enhancing convergence of the idle speed to the target idle speed and improving fuel economy. Further, as explained above in the second embodiment, ECU 30 has the table of FIG. 15 showing the correction value (reference add speed Nup800)

relative to the parameter (reference vehicle speed VSPNET) in the case of the reference speed (800 rpm). ECU 30 retrieves the correction value (reference add speed Nup800) from the table of FIG. 15 on the basis of the parameter (reference vehicle speed VSPNET). Accordingly, the number of tables to be stored in ECU 30 can be minimized so that memory space of ECU 30 can be saved.

Further, in the second embodiment, ECU 30 corrects the parameter (vehicle speed VSP) by multiplying the parameter (vehicle speed VSP) by the ratio (800/Nset0) between the reference speed (800 rpm) and basic idle speed Nset0. The correction of the parameter (vehicle speed VSP) can be adequately performed. Further, in the second embodiment, ECU 30 corrects the correction value (reference add speed Nup800) which is retrieved from the table of FIG. 15 on the basis of basic idle speed Nset0. Accordingly, the number of tables to be stored in ECU 30 can be minimized so that memory space of ECU 30 can be saved. Furthermore, in the second embodiment, ECU 30 corrects the correction value (reference add speed Nup800) by multiplying the correction value (reference add speed Nup800) by correction coefficient NETBY, i.e., the ratio (QD−QN)/(QD800−QN800) of the difference (QD−QN) between D-range basic air flow amount QD and N-range basic air flow amount QN at basic idle speed Nset0 to the difference (QD800−QN800) between D-range basic air flow amount QD800 and N-range basic air flow amount QN800 at the reference speed (800 rpm). By using correction coefficient NETBY, the correction of the correction value (reference add speed Nup800) can be adequately performed.

The present invention is not limited to the first and second embodiments in which idle control valve 13 is arranged parallel to throttle valve 12. The present invention may be applied to an internal combustion engine having an electronically controlled throttle valve. In such a case, ECU 30 can be programmed to directly control the electronically controlled throttle valve so as to vary the opening degree based on the sum of an accelerator requested air flow amount and an idle air flow amount.

Further, the parameter relative to the speed ratio of T/C 21 is not limited to vehicle speed VSP as used in the first and second embodiments. The parameter may be the torque converter speed ratio per se which is determined by dividing torque converter turbine speed Nt by engine speed Ne. Torque converter turbine speed Nt may be determined as a product of the rotation number of transmission output shaft, namely, vehicle speed, and transmission ratio (gear ratio). Alternatively, torque converter turbine speed Nt may be detected by using a turbine rotation sensor.

This application is based on a prior Japanese Patent Application No. 2002-279473 filed on Sep. 25, 2002. The entire contents of the Japanese Patent Application No. 2002-279473 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An idle speed control system for a vehicle including an internal combustion engine coupled to an automatic transmission which has a torque converter, the idle speed control system comprising:

a sensor operative to detect a parameter based on a torque converter speed ratio and generate a signal indicative of the parameter detected; and a controller programmed to:

determine basic idle speed; and determine a target idle speed by correcting the basic idle speed based on the signal such that the target idle speed increases at the parameter based on the torque converter speed ratio increases when the automatic transmission is in a drive range in engine idling condition.

2. The idle speed control system as claimed in claim 1, wherein the controller is programmed to determine a correction value so as to increase the target idle speed as the torque converter speed ratio changes from zero toward one.

3. The idle speed control system as claimed in claim 1, wherein the parameter is a vehicle speed.

4. The idle speed control system as claimed in claim 1, wherein the parameter is the torque converter speed ratio.

5. The idle speed control system as claimed in claim 3, wherein the controller is programmed to determine a correction value so as to increase the target idle speed as the vehicle speed increases.

6. The idle speed control system as claimed in claim 1, wherein the controller is programmed to determine a plurality of correction values for correcting the basic idle speed which correspond to different values of the basic idle speed.

7. The idle speed control system as claimed in claim 6, wherein the controller is programmed to store a plurality of tables corresponding to the different values of the basic idle speed, the tables indicating the correction values, respectively.

8. The idle speed control system as claimed in claim 6, wherein the controller is programmed to:

store a table corresponding to a reference speed and indicating the correction value;

correct the parameter based on the basic idle speed; and retrieve the correction value from the table on the basis of the corrected parameter.

9. The idle speed control system as claimed in claim 8, wherein the controller is programmed to correct the parameter by multiplying the parameter by a ratio between the reference speed and the basic idle speed.

10. The idle speed control system as claimed in claim 6, wherein the controller is programmed to:

store a table corresponding to a reference speed and indicating the correction value;

retrieve the correction value from the table; and correct the retrieved correction value based on the basic idle speed.

11. The idle speed control system as claimed in claim 10, wherein the controller is programmed to correct the retrieved correction value by multiplying the retrieved correction value by a ratio of a difference between a drive range basic air flow amount at the basic idle speed and a neutral range basic air flow amount at the basic idle speed, to a difference between a drive range basic air flow amount at the reference speed and a neutral range basic air flow amount at the reference speed.

12. A method for controlling an engine idle speed in an internal combustion engine of a vehicle, the internal combustion engine being coupled to an automatic transmission having a torque converter, the method comprising:

determining basic idle speed when the automatic transmission is in a drive range in engine idling condition;

detecting a parameter based on a torque converter speed ratio; and determining a target idle speed by correcting the basic idle speed based on the parameter based on a torque converter speed ratio such that the target idle speed increases as the parameter based on the torque converter speed ratio increases.

13. The method as claimed in claim 12, wherein the correcting operation comprises determining a correction value so as to increase the target idle speed as the torque converter speed ratio changes from zero toward one.

14. The method as claimed in claim 12, wherein the parameter is a vehicle speed.

15. The method as claimed in claim 12, wherein the parameter is the torque converter speed ratio.

16. The method as claimed in claim 14, wherein the correcting operation comprises determining a correction value so as to increase the target idle speed as the vehicle speed increases.

17. The method as claimed in claim 12, wherein the correcting operation comprises determining a plurality of correction values for correcting the basic idle speed which correspond to different values of the basic idle speed.

18. The method as claimed in claim 17, further comprising providing a plurality of tables which corresponds to the different values of the basic idle speed and indicates the correction values, respectively.

19. The method as claimed in claim 17, further comprising providing a table which corresponds to a reference speed and indicates the correction value, correcting the parameter based on the basic idle speed, and retrieving the correction value from the table on the basis of the corrected parameter.

20. The method as claimed in claim 19, wherein the correcting operation comprises correcting the parameter by multiplying the parameter by a ratio between the reference speed and the basic idle speed.

21. The method as claimed in claim 17, further comprising providing a table which corresponds to a reference speed and indicates the correction value, wherein the correction value is retreived from the table and the retreived correction value is corrected based on the basic idle speed.

22. The method as claimed in claim 21, wherein the correcting operation comprises correcting the retrieved correction value by multiplying the retrieved correction value by a ratio of a difference between a drive range basic air flow amount at the idle speed and a neutral range basic air flow amount at the idle speed, to a difference between a drive range basic air flow amount at the reference speed and a neutral range basic air flow amount at the reference speed.

23. An idle speed control system for a vehicle including an internal combustion engine coupled to an automatic transmission which has a torque converter, the idle speed control system comprising:

a sensor operative to detect a parameter based on a torque converter speed ratio and generate a signal indicative of the parameter detected; and a controller programmed to:

determine basic idle speed; and determine a target idle speed by correcting the basic idle speed based on the signal when the automatic transmission is in a drive range in engine idling condition, wherein the controller is programmed to determine a correction value so as to increase the target idle speed as the torque converter speed ratio changes from zero toward one.

24. An idle speed control system for a vehicle including an internal combustion engine coupled to an automatic transmission which has a torque converter, the idle speed control system comprising:

a sensor operative to detect a parameter based on a torque converter speed ratio and generate a signal indicative of the parameter detected; and a controller programmed to:

determine basic idle speed; and determine a target idle speed by correcting the basic idle speed based on the signal when the automatic transmission is in a drive range in engine idling condition, wherein the parameter is the torque converter speed ratio.

25. An idle speed control system for a vehicle including an internal combustion engine coupled to an automatic transmission which has a torque converter, the idle speed control system comprising:

a sensor operative to detect a parameter based on a torque converter speed ratio and generate a signal indicative of the parameter detected; and a controller programmed to:

determine basic idle speed; and determine a target idle speed by correcting the basic idle speed based on the signal when the automatic transmission is in a drive range in engine idling condition, wherein the parameter is a vehicle speed, and wherein the controller is programmed to determine a correction value so as to increase the target idle speed as the vehicle speed increases.

26. A method for controlling an engine idle speed in an internal combustion engine of a vehicle, the internal combustion engine being coupled to an automatic transmission having a torque converter, the method comprising:

determining basic idle speed when the automatic transmission is in a drive range in engine idling condition;

detecting a parameter based on a torque converter speed ratio; and determining a target idle speed by correcting the basic idle speed based on the parameter, wherein the correcting operation comprises determining a correction value so as to increase the target idle speed as the torque converter speed ratio changes from zero toward one.

27. A method for controlling an engine idle speed in an internal combustion engine of a vehicle, the internal combustion engine being coupled to an automatic transmission having a torque converter, the method comprising:

determining basic idle speed when the automatic transmission is in a drive range in engine idling condition;

detecting a parameter based on a torque converter speed ratio; and determining a target idle speed by correcting the basic idle speed based on the parameter, wherein the parameter is the torque converter speed ratio.

28. A method for controlling an engine idle speed in an internal combustion engine of a vehicle, the internal combustion engine being coupled to an automatic transmission having a torque converter, the method comprising:

determining basic idle speed when the automatic transmission is in a drive range in engine idling condition;

detecting a parameter based on a torque converter speed ratio; and determining a target idle speed by correcting the basic idle speed based on the parameter, wherein the parameter is a vehicle speed, and wherein the correcting operation comprises determining a correction value so as to increase the target idle speed as the vehicle speed increases.

* * * * *